(12) United States Patent
Marxer et al.

(10) Patent No.: US 12,427,574 B2
(45) Date of Patent: Sep. 30, 2025

(54) ADDITIVE MANUFACTURING METHOD

(71) Applicant: Hilti Aktiengesellschaft, Schaan (LI)

(72) Inventors: Miriam Marxer, Ruggell (LI); Maria Zivcec, Buchs (CH); Maurizio Rosario Gullo, Boniswil (CH); Federico Dalcanale, Basel (CH); Ralf Schumacher, Seltisberg (CH); Efrain Carreño-Morelli, Sion (CH); Mikel Rodríguez-Arbaizar, Sion (CH)

(73) Assignee: Hilti Aktiengesellschaft, Schaan (LI)

( * ) Notice: Subject to any disclaimer, the term of this patent is extended or adjusted under 35 U.S.C. 154(b) by 753 days.

(21) Appl. No.: 17/785,165

(22) PCT Filed: Jan. 18, 2021

(86) PCT No.: PCT/EP2021/050924
§ 371 (c)(1),
(2) Date: Jun. 14, 2022

(87) PCT Pub. No.: WO2021/151706
PCT Pub. Date: Aug. 5, 2021

(65) Prior Publication Data
US 2023/0028041 A1 Jan. 26, 2023

(30) Foreign Application Priority Data
Jan. 28, 2020 (EP) .................................... 20154046

(51) Int. Cl.
*B22F 10/16* (2021.01)
*B22F 1/102* (2022.01)
(Continued)

(52) U.S. Cl.
CPC .............. *B22F 10/16* (2021.01); *B22F 1/102* (2022.01); *B22F 1/148* (2022.01); *B33Y 10/00* (2014.12); *B33Y 70/00* (2014.12); *B22F 2301/35* (2013.01)

(58) Field of Classification Search
CPC ................................. B22F 1/148; B22F 10/16
See application file for complete search history.

(56) References Cited

U.S. PATENT DOCUMENTS

| 2015/0210016 A1 | 7/2015 | Okamoto |
| 2018/0236538 A1 | 8/2018 | Gibson et al. |

(Continued)

FOREIGN PATENT DOCUMENTS

EP   1 770 176 A1   4/2007

OTHER PUBLICATIONS

International Search Report and Written Opinion in International Application No. PCT/EP2021/050924, mailed Mar. 26, 2021.

*Primary Examiner* — Sally A Merkling
*Assistant Examiner* — Sean P. O'Keefe
(74) *Attorney, Agent, or Firm* — Leydig, Voit & Mayer, Ltd.

(57) ABSTRACT

A method for a workpiece comprising a material composed of a base material and an additive is disclosed, the method including spreading a granular material in superimposed layers. The granular material contains the base material and an organic binder. An ink contains a solvent for dissolving the binder, and a suspension of the additive. Using the ink, patterns are printed onto individual layers. The ink dissolves the binder in the region of the patterns, and introduces the additive in the region of the patterns. The patterns in the layers together produce a three-dimensional shape of the workpiece. The solvent is expelled so that the granular material is connected by the binder and the additive is fixed.

(Continued)

Granular material unwetted by the solvent is removed to reveal the green compact of the workpiece. The green compact is thermally treated to convert the base material and the additive into the material.

11 Claims, 3 Drawing Sheets

(51) Int. Cl.
    *B22F 1/148*     (2022.01)
    *B33Y 10/00*     (2015.01)
    *B33Y 70/00*     (2020.01)

(56) References Cited

U.S. PATENT DOCUMENTS

| | | | |
|---|---|---|---|
| 2019/0047045 A1* | 2/2019 | Shaarawi | B22F 10/64 |
| 2019/0270135 A1 | 9/2019 | Kasperchik et al. | |
| 2019/0388966 A1 | 12/2019 | Gibson et al. | |
| 2021/0260652 A1* | 8/2021 | Bose | B22F 1/065 |

* cited by examiner

ADDITIVE MANUFACTURING METHOD

CROSS-REFERENCE TO RELATED APPLICATIONS

This patent application is the U.S. National Stage of International Patent Application No. PCT/EP2021/050924, filed Jan. 18, 2021, which claims the benefit of European Patent Application No. 20154046.5, filed Jan. 28, 2020, which are each incorporated by reference.

FIELD OF THE INVENTION

The present invention relates to an additive manufacturing method for metal, ceramic and metal-ceramic composite workpieces, in particular for workpieces which contain a structurally inhomogeneous distribution of carbon, nitrogen, doping elements, alloying elements, second phase particles (reinforcements, grain growth inhibitors, etc.).

The use of additive manufacturing methods for the manufacturing of workpieces is known, for example, from US 2018/236538 A1. A three-dimensional shape of the workpiece is rendered in a sequence of two-dimensional cross sections. The manufacturing occurs by the workpiece being constructed as successive layers corresponding to the sequence of cross sections. For each layer, first a powder is spread in a flat powder bed. The composition of the powder generally corresponds to the material of the workpiece to be produced. A binder is printed onto the powder bed in a pattern according to one of the part cross sections. The binder locally bonds the loose powder particles to each other, and the ongoing bonded layer with the preceding layer. The spreading of the powder and printing of the binder is repeated until a three-dimensional shape of the workpiece is reproduced from the plurality of layers. The unbound powder is removed, thereby revealing the shape of the workpiece. The workpiece can be thermally further treated and hardened. The binder is removed and the workpiece is sintered. A workpiece is produced according to the predetermined shape, but is bound to the material composition which is predetermined by the powder.

DISCLOSURE OF THE INVENTION

The additive manufacturing method according to the invention makes possible to manufacture workpieces that are based on a granular material and have different material properties which are achieved by local deposition of doped inks. It is not necessary to provide different granular materials for different properties. The manufacturing method can also achieve different material properties in a workpiece based on the one granular material.

The additive manufacturing method for a workpiece comprising a material composed of a base material and an additive is based on the following steps. A granular material is spread in superimposed layers. The granular material contains a base material and an organic binder. An ink contains a solvent for dissolving the organic binder, and a suspension of the additive. The solvent is preferably volatile at room temperature. Patterns are printed onto the individual layers using the ink. The applied ink at least partially dissolves the organic binder in the region of the patterns, and the ink introduces the additive in the region of the patterns. The patterns in the superimposed layers together form the three-dimensional shape of the workpiece. The solvent is expelled, as a result of which the granular material is locally connected by the organic binder and the additive is fixed. The granular material unwetted by the solvent is removed in order to reveal a green compact of the workpiece. The green compact is thermally treated in order to convert the base material and the additive into the material.

One preferred embodiment makes it possible to set different material properties within one workpiece. The workpiece has first regions made of a first material based on a base material and second regions made of a second material based on the base material and at least one additive. The additive manufacturing method includes the following steps. A granular material is spread in superimposed layers. The granular material contains the base material and an organic binder. A first ink contains a solvent for dissolving the organic binder. At least one second ink contains the solvent for dissolving the organic binder, and a suspension of the at least one additive. First patterns are printed onto at least one first group of layers using the first ink and second patterns are printed onto at least one second group of layers using the second ink. The first patterns and the second patterns in the superimposed layers correspond, when combined, to the three-dimensional shape of the workpiece. The solvent is expelled, as a result of which the wetted granular material is locally connected by the organic binder and the at least one additive is fixed. The granular material unwetted by the solvent is removed in order to reveal the green compact of the workpiece. The green compact is thermally treated in order to convert the base material in the first regions into the first material and to convert the base material provided with at least one additive in the second regions into the second material.

In another preferred embodiment, only a fraction of the granular material consist of powder aglomerated using an organic binder. Another fraction consists of loose powder, binderless aglomerated powder or presintered agglomerated powder. Both fractions are mixed to form granules beds, which are selectively consolidated by dropping solvent or polymer-solvent solutions.

BRIEF DESCRIPTION OF THE FIGURES

The following description explains the invention with reference to exemplary embodiments and figures. The figures show.

EMBODIMENTS OF THE INVENTION

Figure 1:
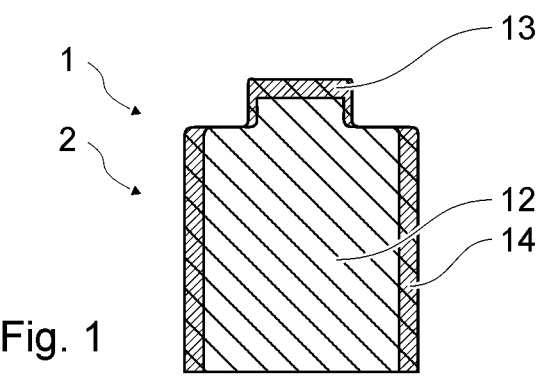
FIG. 1 a striker of a hammer drill
FIG. 2 schematic structure of a hammer drill
FIG. 3 an exemplary granular material
FIG. 4 illustration of a manufacturing method
FIG. 5 illustration of a manufacturing method
FIG. 6 illustration of a manufacturing method
FIG. 7 sequence of a manufacturing method Identical or functionally identical elements are indicated by the same reference numerals in the figures, unless stated otherwise.
Figure 2:
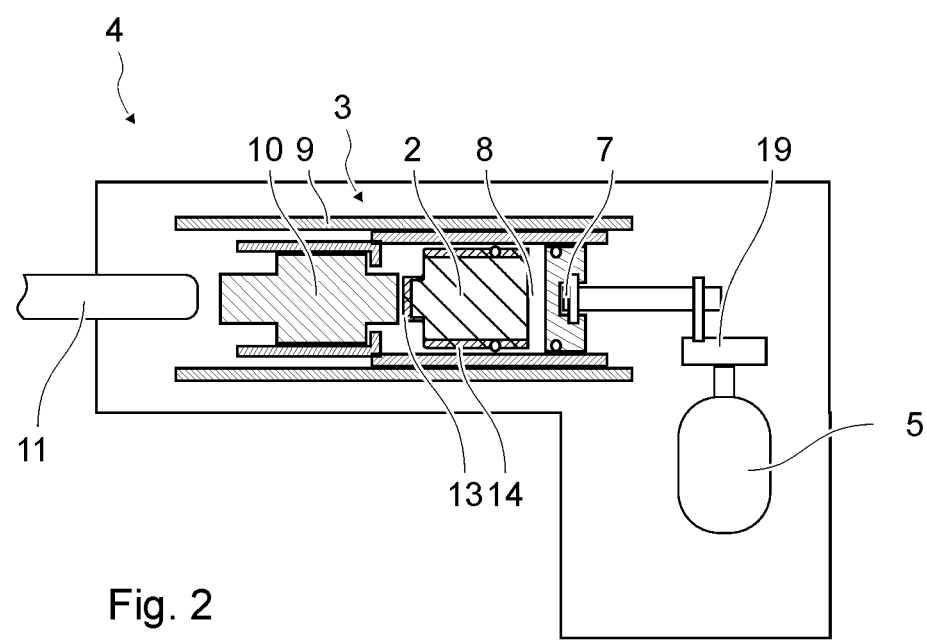

FIG. 1 illustrates an exemplary workpiece 1, which is manufactured by means of an additive manufacturing method. The exemplary workpiece 1 is a striker 2 of an electro-pneumatic striking mechanism 3. FIG. 2 shows a schematic structure of an electro-pneumatic striking mechanism 3 in a hand-held tool 4. The striking mechanism 3 has an electric motor 5 as a drive. The electric motor 5 is coupled to an exciter piston 7 via a transmission 6. The striker 2 is coupled to the exciter piston 7 via an air spring 8. The air spring 8 is a pneumatic chamber which is closed along a movement axis by the exciter piston 7 and the striker 2. The striker 2, driven by the exciter piston 7, moves periodically backwards and forwards in a guide tube 9. The striker 2 thereby periodically strikes a snap die 10, which transmits the strike to a chisel 11 or another tool.

The striker 2 has a body made of steel. The surfaces of the striker 2 are subject to different loads. The body 12 and a front end face 13 are intended to be made of a first material which is tough and resilient in order to be resistant to the regular strikes on a tool or a snap die 10. A cylindrical lateral face 14 is subject to wear due to abrasion, which results when sliding the lateral face 14 on a guide tube 9. The lateral face 14 is therefore preferably made of a second material that has a high hardness. The different requirements can be met by structuring the material composition in the different regions of the striker 2. The tough and resilient material is, for example, a steel having a low carbon content. The material having a high hardness is, for example, a steel having a high carbon content. An exemplary steel has the designation 18CrNiMo7, and, in addition to iron as the main component, the steel contains 0.2% carbon, 0.6% manganese, 1.8% chromium, 0.35% molybdenum and 1.7% nickel. The end face 13 contains, for example, 0.2 wt. % carbon, and the lateral face 14 contains 0.8% carbon. From the point of view of the material composition, the two materials can be produced from one base material 15. By comparison with the first material, the second material is supplemented by an additive 16. In this example, the additive 16 is carbon. The invention is not limited to these two steels, the examples are merely given to indicate the concept of a base material and the first and second material being derivates of the base materials.

Figure 3:
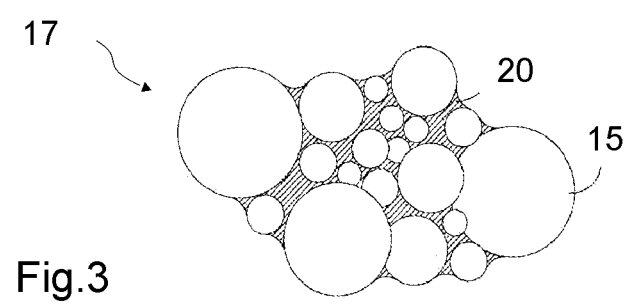

An exemplary additive manufacturing method for manufacturing the workpiece 1 uses a granular material 17 and two different inks 18, 19 as starting materials. The granular material 17 contains the base material 15 and an organic binder 20. An exemplary base material 15 contains iron powder. The base material 15 may, in addition to iron, contain steel refiners such as cobalt, nickel, molybdenum, etc. The quantity ratios are adjusted according to the stoichiometric composition of the steel. The grains of the base material are between 20 μm (micrometers) and 80 μm in size. The organic binder 20 is polyvinyl butyral (PVB), for example. The organic binder 20 is preferably strongly adhesive and solid at room temperature. The organic binder 20 may also be provided as grains which are mixed with the grains of the base material 15. Alternatively, the grains of the base material 15 can be wetted or coated with the organic binder 20. In any case, the granular material 17 consists of loose grains that can be poured and spread flat. FIG. 3 illustrates an exemplary granular material. A grain of the granular material may be composed of a plurality of grains of different sizes of the base material. The grain of the granular material is held together by the organic binder.

The first ink 18 consists of a solvent 21 which dissolves the organic binder 20. An exemplary solvent 21 is butanol, in which polyvinyl butyral dissolves. The solvent 21 is preferably highly volatile at room temperature or volatile at temperatures well below the melting point of the binder 20, for example below 120° C. The second ink 19 contains, in addition to the solvent 21 for the organic binder 20, a suspension of the additive 16. The additive 16 is carbon, for example. The carbon can be brought into suspension, for example in the form of carbon nanotubes, graphite, graphene, fullerene, carbon black, i.e. as a fine granular material, with the solvent 21. The grains of the additive 16 are preferably smaller than the grains of the granular material 17 by at least one order of magnitude.

The exemplary additive manufacturing method produces the green compact 23 of the workpiece 1 by repeatedly alternately spreading a layer 24 of the granular material 17 and printing patterns onto the spread layer 24 using the two inks 18, 19. The green compact 23 is constructed layer by layer from the printed layers 24. The individual layers 24 correspond to cross sections through the workpiece 1. The patterns for the inks 18, 19 are derived from the material distribution in the cross sections. The first patterns 25 correspond to regions of a first material of the workpiece 1, e.g. the regions made of the low-carbon steel. The second patterns 26 correspond to regions of a second material of the workpiece 1, e.g. the regions made of the carbon-rich steel. Taken together, the superimposed patterns produce the three-dimensional shape of the workpiece 1. In the example, the first patterns 25 together produce the resilient regions of the workpiece 1 made of the first material and the second patterns 26 together produce the hard regions of the workpiece 1 made of the second material.

Figure 4:
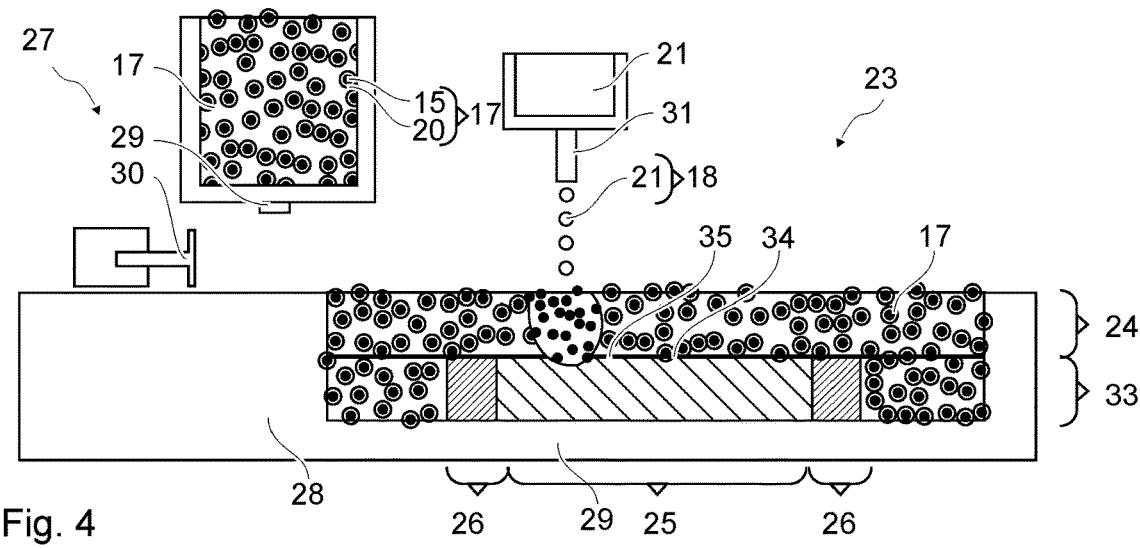
Figure 5:
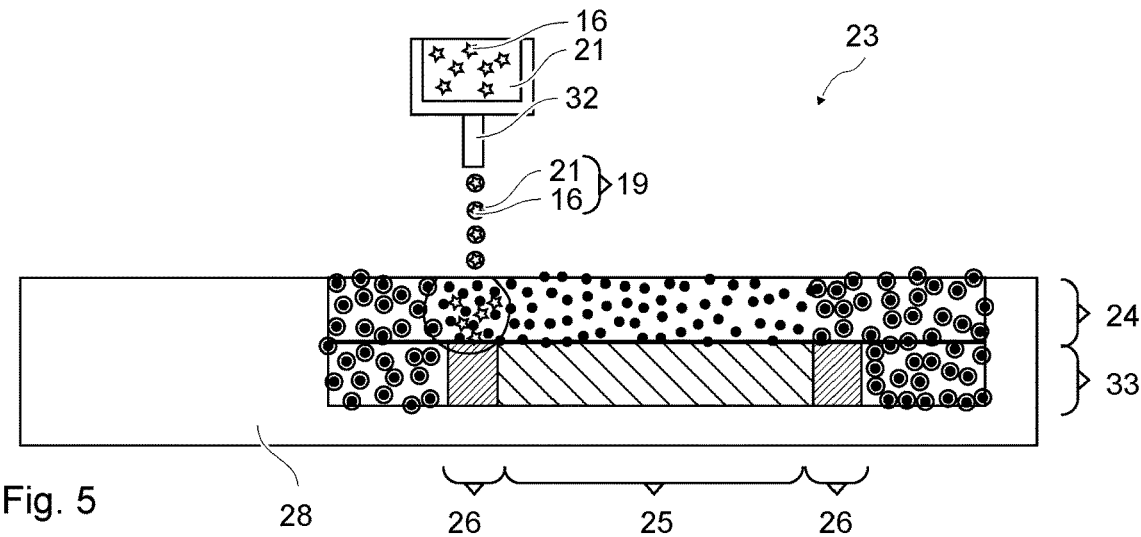
Figure 6:
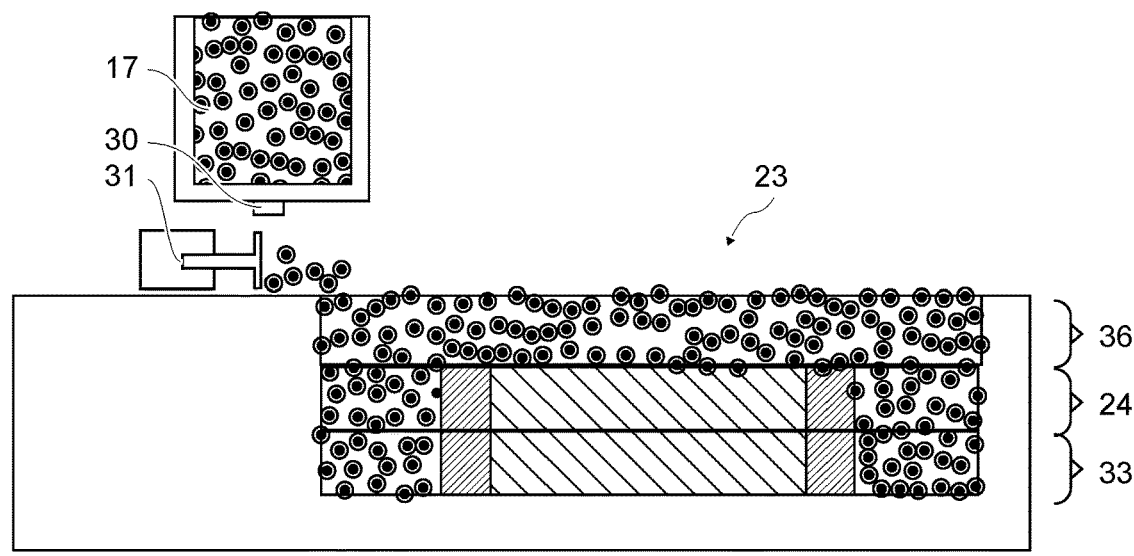

The green compact 23 can be manufactured using different apparatuses. To illustrate, an exemplary apparatus 27 for the additive manufacturing method is shown in FIG. 4. The apparatus 27 has a powder bed 28, on which the green compact 23 is produced. The powder bed 28 is, for example, a trough having a flat bottom. A dispenser 29 can spread the loose granular material 17 onto the bottom of the trough or onto the partially manufactured green compact 23 on the powder bed 28. A slider 30 or the like can smooth the layer 24. The slider 30 can adapt a thickness of the layer 24. The slider 30 can also compress the granular material 17. The apparatus 27 has at least one movable spray head 31. The spray head 31 can be moved laterally over the powder bed 28. The spray head 31 can selectively output the ink 18 in a predetermined pattern. The apparatus 27 includes a corresponding control device which controls the movement of the spray head 31 and the output of the ink 18 by the spray head 31. The apparatus may include a second spray head 32 for a second ink 19.

Figure 7:
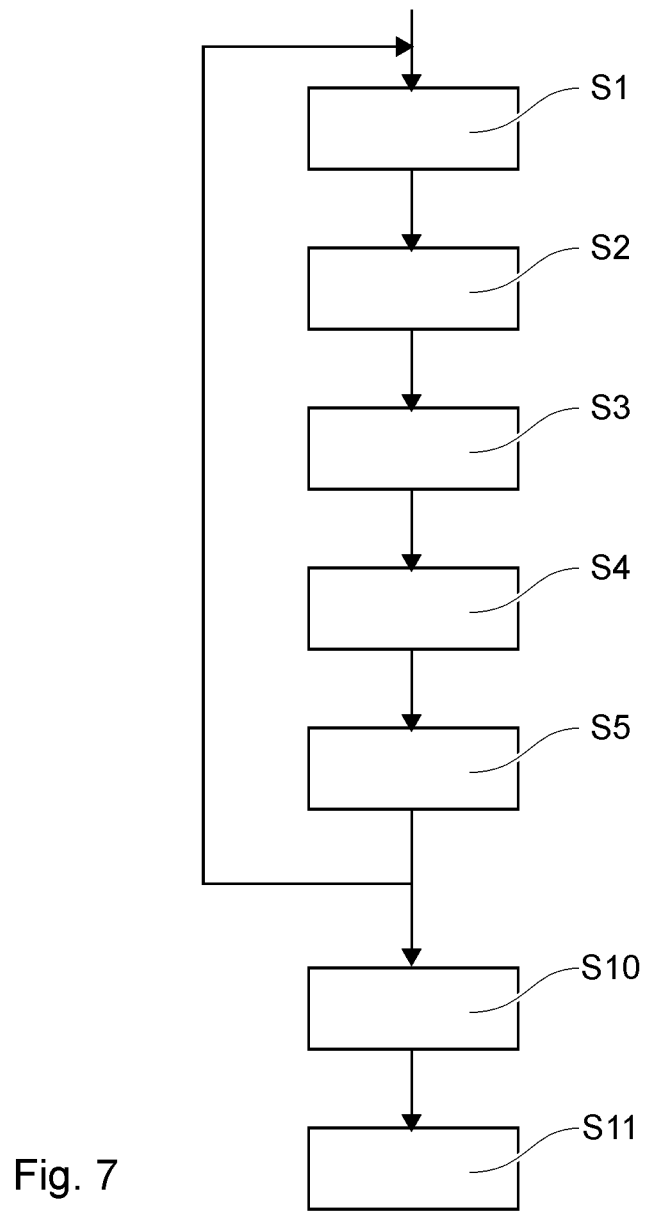

A sequence of an exemplary manufacturing method will be described in the following (FIG. 7). A layer 24 of the granular material 17 is spread (S1), for example spread by the dispenser 29 onto the powder bed 28. The spread layer 24 is preferably homogeneous. Material composition and density, and preferably other properties, of the granular material 17 are uniform over the entire lateral extension of the granular material 17. A thickness of the layer 24 is preferably uniform. A thickness of the layer 24 may be between 50 μm (micrometers) and 500 μm. The layers 24 may have the same thickness. In another embodiment, regions having a higher degree of detail can be constructed from layers 24 having a smaller thickness.

A first pattern 25 is printed (S2) onto the loose granular material 17 in the spread layer 24 using the first ink 18. The ink 18 infiltrates into the layer 24. The solvent 21 contained in the ink 19 reactivates the organic binder 20. The organic binder 20 is present in the granular material 17 in solid and non-adhesive form. The solvent 21 dissolves the binder 20 at least on the surfaces of the grains. The binder 20 wetted with the solvent 21 or binder 20 dissolved by the solvent 21 bonds with adjacent grains. The bonding may be physical or chemical. The solvent 21 is highly volatile. The powder bed 28 can also be heated or heat lamps support the evaporation or other removal of the solvent 21. The binder 20 solidifies again, with adjacent grains of the granular material 17 now being bonded. The granular material 17 is bonded (S3) in the layer 24 according to the first pattern 25. The ink 18 infiltrates up to the preceding layer 33. The grains having binder 20 on the lower face 34 of the uppermost layer 24 and the grains having binder 20 on the upper face 35 of the preceding layer 24 are wetted by the solvent 21 and activated. As a result, the uppermost layer 24 is connected to the preceding layer 33. A depth to which the ink 18 infiltrates into the layer 24 limits, among other factors, the maximum thickness of the layer 24.

A second pattern 26 is printed (S4), using the second ink 19, onto the uppermost layer 24 printed with the first pattern 25. The second ink 19 preferably contains the same solvent 21 as the first ink 18. In addition to the solvent 21, the second ink 19 additionally contains the additive 16. The ink 19 infiltrates into the layer 24, the solvent 21 also transporting the additive 16. The solvent 21 activates the binder 20 and ensures bonding of adjacent grains. When the solvent 21 is expelled, the binder 20 solidifies. The additive 16 is fixed (S5) by the solidified binder 20. The additive 16 is thereby distributed in the layer 24 according to the second pattern 26. The granular material 17 in the layer 24 is now bonded according to the first pattern 25 and the second pattern 26, and the additive 16 is distributed in the layer 24 according to the second pattern 26.

The granular material 17 in a subsequent layer 36 is spread (S1) onto the layer 24 printed with the two patterns 25, 26. A first pattern 25 and a second pattern 26 are printed onto the most recently spread uppermost layer 24 using the inks 18, 19. This sequence consisting of spreading the granular material 17 and printing is repeated until the green compact 23 is completed.

The first pattern 25 and the second pattern 26 are derived, inter alia, from the material distribution of the cross sections through the workpiece 1. In this case, three different groups of cross sections can qualitatively occur: the cross section consists homogeneously of the first material, the cross section consists homogeneously only of the second material, and the cross section consists of the first material and the second material mixed. The groups of layers 24 corresponding to cross sections comprising mixed material are printed using the two inks 18, 19. The groups of layers 24 corresponding to homogeneous cross sections are printed using only one of the two inks. The printing of the most recently spread layer 24 using the first ink 18 and the second ink 19 can temporally follow one after the other, in particular if two different spray heads 32 are used for this purpose. The two inks 18, 19 can also be printed simultaneously. For example, the spray head 32 is moved over the layer 24 row by row and column by column. The spray head 32 outputs the first ink 18 in regions of the first pattern 25 and outputs the second ink 19 in regions of the second pattern 26.

The manufactured green compact 23 is removed (S10) from the powder bed 28. The granular material 17 not wetted by the ink 19 is loose and can be removed from the green compact 23. For example, the granular material 17 can be removed by means of compressed air.

The green compact 23 is converted into the workpiece 1 by thermal treatment, for example by sintering (S11). Before or during the thermal treatment, the organic binder 20 is expelled from the green compact 23. Because the green compact 23 loses mass in this process, shrinkage typically results. The thermal treatment typically converts the base material 15 into a first material, and converts the base material 15 provided with the additive 16 into a second material. In the example, a steel grade having a low carbon content can result from the ferrous base material 15 and a steel grade having a higher carbon content can result from the ferrous base material 15 provided with the carbon black-containing additive 16.

A workpiece that can be manufactured by way of example consists entirely of steel, i.e. iron having the additive carbon. The carbon content of the steel is higher in the edge regions than in the core of the workpiece. The material composition makes it possible to manufacture the workpiece on the basis of one base material and different concentrations of the additive.

An example of this additive manufacturing method produces the green compact of the workpiece by repeatedly alternately spreading a layer of the granular material and printing patterns using a first ink and a second ink. The granular material contains the base material and the binder. The first ink contains the solvent for the binder and the additive in a first concentration. The second ink also contains the solvent and the additive, but in a different second concentration. Examples of the base material, the additive, the binder and the solvent can be taken from the manufacturing methods described above.

The sequence of the method steps for this manufacturing method may correspond to the method steps of the manufacturing method described above. The granular material is spread in one layer. For example, the first ink is firstly printed onto the uppermost layer according to a first pattern. The granular material is bonded according to the first pattern and the additive is introduced into the layer at a first concentration. After the first ink, the second ink is printed onto the granular material according to a second pattern. The first ink may have a lower concentration of the additive than the second ink. The granular material is bonded according to the second pattern and the additive is introduced into the layer at a second concentration. Similar to the previous manufacturing method, the order of applying the first ink and the second ink may be reversed or the two inks may be applied alternately. A subsequent layer comprising the loose granular material is applied to the printed layer.

Alternatively, the manufacturing method may be carried out using only one ink. An example of this additive manufacturing method produces the green compact of the workpiece by repeatedly alternately spreading a layer of the granular material and printing first patterns and second patterns using the ink. The first patterns correspond to the cross sections of the workpiece. The second patterns correspond only to the regions of higher concentration of the additive in the cross sections of the workpiece. The second patterns may completely overlap with the first patterns. The granular material contains the base material and the binder. The ink contains the solvent for the binder and the additive in one concentration. Examples of the base material, the additive, the binder and the solvent can be taken from the manufacturing methods described above.

The following sequence is an exemplary sequence of the additive manufacturing method using one ink. The granular material is spread in one layer. A first pattern is printed onto the uppermost layer using the ink. The granular material is bonded according to the first pattern and the additive is introduced into the layer. The concentration of the additive in the region of the first pattern is determined by the concentration of the additive in the ink. The second pattern is printed, using the same ink, onto the layer printed with the first pattern. Insofar as the first pattern and the second pattern overlap, the binder is dissolved again and additional additive is introduced to the already present additive. The concentration of the additive increases in the region of the second pattern as a result. After printing twice or multiple times using the ink, a subsequent layer comprising the loose granular material is spread onto the printed layer.

In the examples described, the binder is based on polyvinyl butyral (PVB). The manufacturing method is not limited to this. Other suitable organic binders include, for example, polyvinyl alcohol (PVA), polyethylene glycol (PEG) or polyethylene methacrylate (PMMA). The solvent contained in the ink is based on butanol, isopropanol, water, hexane, heptane, acetone, ethanol, or other solvents for the organic binder.

The base material preferably has a dominant proportion of iron. Steel refiners, for example manganese, chromium, nickel, molybdenum, and cobalt, can be mixed into the iron. Carbon may also be added to the base material. The additive may consist of carbon, steel refiners or a mixture thereof. In the above examples, the carbon content was locally increased by the ink in the layer. The additive manufacturing method also makes it possible to increase the proportion of steel refiners in the layer according to a pattern. The examples described use one ink or two different inks. The additive manufacturing method is not limited to this, but the base material can be supplemented by a plurality of different inks. The inks all contain a solvent, preferably the same solvent. The inks may contain different additives and/or concentrations of the additives.

The patterns are substantially the same shape as the cross sections. Effects such as shrinkage, expansion, twisting or similar shape changes during the thermal treatment can be compensated for in the patterns. For example, it is known that the workpiece shrinks isotropically by up to 50% during sintering. The patterns are increased with respect to the cross sections by a corresponding factor in order to compensate for the shrinkage. Similarly, more complex size changes or deformations during the manufacturing method can also be compensated for by determining the patterns such that size changes and deformations that occur during the manufacturing method produce the relevant cross section when applied to the pattern.

The invention claimed is:

1. An additive manufacturing method for producing a workpiece comprising a first region made of a first material based on a base material and at least one second region made of a second material based on the base material and at least one additive, the method comprising:
   spreading a granular material in superimposed individual layers, wherein the granular material contains the base material and an organic binder;
   providing a first ink which contains a solvent for dissolving the organic binder;
   providing at least one second ink which contains the solvent, for dissolving the organic binder, and a suspension of the at least one additive;
   printing first patterns onto at least one first group of the individual layers using the first ink and printing second patterns onto at least one second group of the individual layers using the at least one second ink, wherein the first patterns and second patterns in the superimposed layers correspond, when combined, to the three-dimensional shape of the workpiece;
   evaporating the solvent, as a result of which the granular material is locally connected by the organic binder and the at least one additive is fixed;
   removing granular material unwetted by the solvent in order to reveal a green compact of the workpiece; and,
   thermally treating the green compact in order to convert the base material in the first regions into the first material and to convert the base material provided with at least one additive in the second regions into the second material.

2. The additive manufacturing method according to claim 1, wherein the first ink contains an additive, the additive of the first ink having a different material composition to the additive of the second ink.

3. The additive manufacturing method according to claim 2, wherein at least one individual layer belongs to the first group and the second group.

4. The additive manufacturing method according to claim 2, including printing one of the second patterns multiple times onto the individual layers using at least one of the second inks.

5. The additive manufacturing method according to claim 2, including alternating the spreading of the granular material in one individual layer with the printing of the individual layer.

6. The additive manufacturing method according to claim 1 wherein at least one individual layer belongs to the first group and the second group.

7. The additive manufacturing method according to claim 6, including printing one of the second patterns multiple times onto the individual layers using at least one of the second inks.

8. The additive manufacturing method according to claim 1, including printing one of the second patterns multiple times onto the individual layers using at least one of the second inks.

9. The additive manufacturing method according to claim 1, wherein carbon, a steel refiner or a mixture of carbon and a steel refiner is a main component of the additive.

10. The additive manufacturing method according to claim 1, wherein iron is a main component of the base material.

11. The additive manufacturing method according to claim 1, including alternating the spreading of the granular material in one individual layer with the printing of the individual layer.

* * * * *